Nov. 23, 1926. 1,608,205
W. J. FRANCKE
THERMOSTATIC VALVE UNIT
Filed April 3, 1922  2 Sheets-Sheet 1
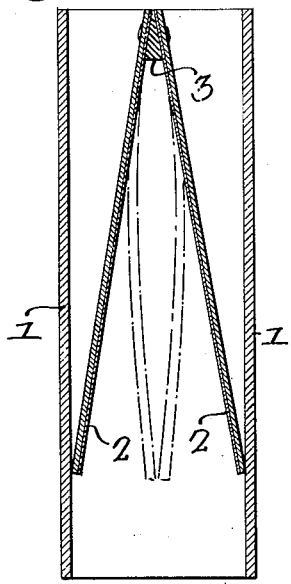
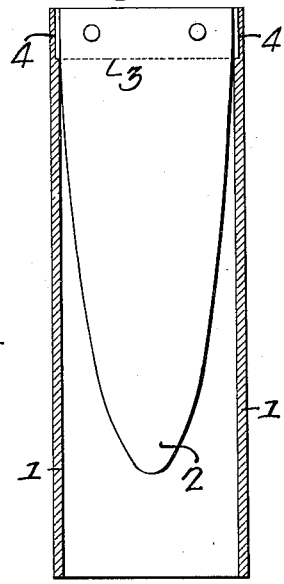
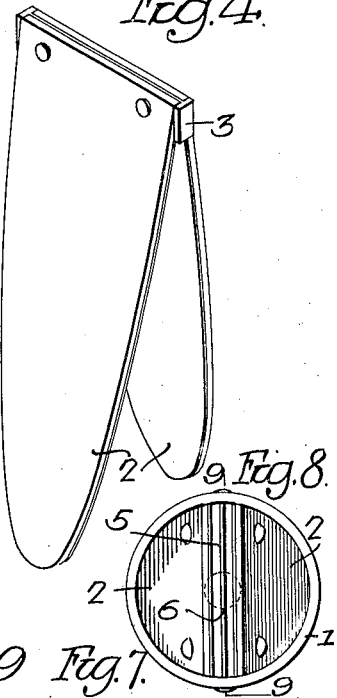
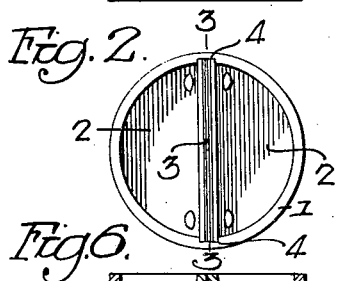
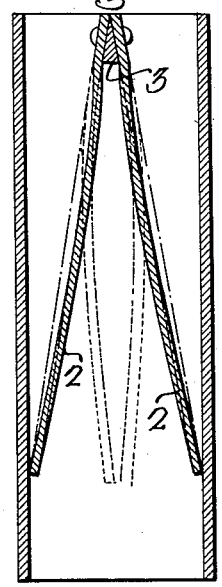
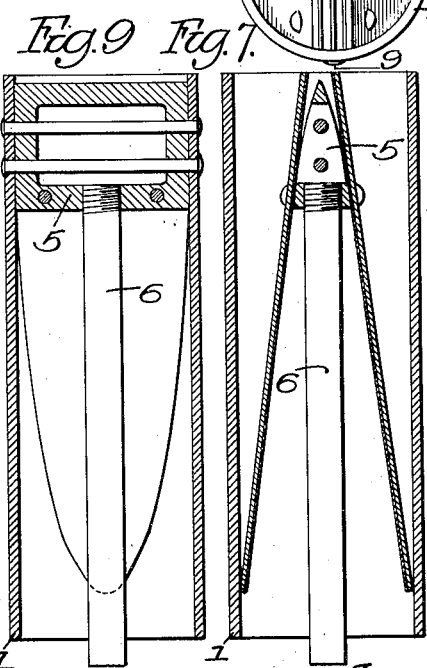
Inventor:—
William J. Francke.
by his Attorneys.
Howson & Howson Nov. 23, 1926.                W. J. FRANCKE                1,608,205
                        THERMOSTATIC VALVE UNIT
                    Filed April 3, 1922    2 Sheets-Sheet 2
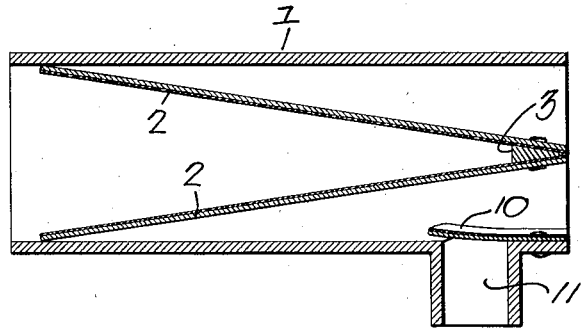
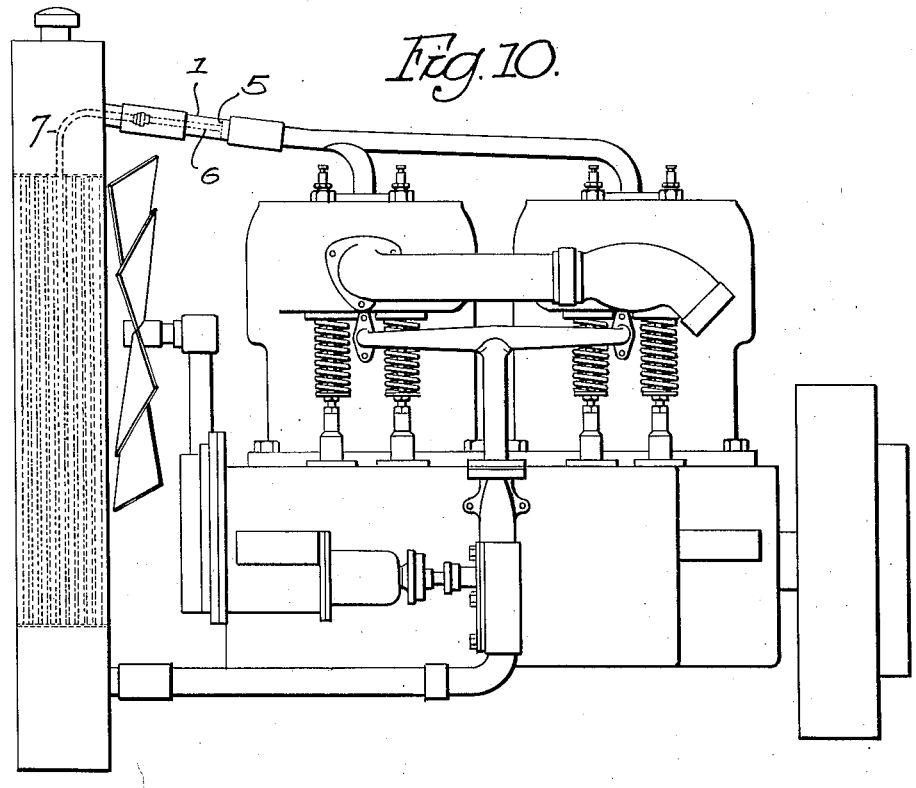
Inventor—
William J. Francke.
by his Attorneys—
Howson & Howson Patented Nov. 23, 1926.

1,608,205

UNITED STATES PATENT OFFICE.

WILLIAM J. FRANCKE, OF NEW BRUNSWICK, NEW JERSEY; ALLEN E. BEALS, RICHARD G. SAVOY, AND RUSSELL E. WATSON EXECUTORS OF SAID WILLIAM J. FRANCKE, DECEASED.

THERMOSTATIC VALVE UNIT.

Application filed April 3, 1922. Serial No. 549,370.

The object of this invention is to provide a novel thermostatic valve unit in which a thermosensitive element constitutes in itself the valve, the unit being such as to render it applicable for numerous purposes where a thermostatic valve may be required, and having advantages of efficiency in operation and simplicity of construction.

In the attached drawings:

Figure 1, is a section through a valve unit made in accordance with my invention;

Fig. 2, is an end view of the unit;

Fig. 3, is a section on the line 3—3, Fig. 2;

Fig. 4, is a view in perspective of the thermosensitive valve elements;

Fig. 5, is a sectional view illustrating a modification in which the thermostat occupies the "open" position at low temperatures;

Fig. 6, is a sectional view illustrating another modification adapted particularly for use with single pipe steam heating systems;

Fig. 7, is a sectional view illustrating a still further modification within the scope of the invention, in which the unit includes an inner duct controlled by the thermostat;

Fig. 8, is an end view of the valve unit of Fig. 7;

Fig. 9, is a section on the line 9—9, Fig. 8;

Fig. 10, is a diagrammatic side elevation of a part of a motor vehicle showing an application of the special form of valve illustrated in Figs. 7, 8 and 9, and Fig. 11, is a section of a still further modification of the valve for a further special use.

With reference to the drawings, the valve unit comprises a tubular casing 1, in the present instance circular in section, within which is established a thermosensitive element comprising in the present instance a pair of thermosensitive vanes or plates 2, 2, joined together on a diameter of the casing 1, and so shaped that when extended in straight lines from the line of junction, as shown in full lines in Fig. 1, the edges of the vanes bear at all points except at their bases against the inner surface of the casing in such manner as to completely close the passage therethrough. The thermosensitive elements are adapted, when the temperature within the casing changes, such as for instance when a fluid passing therethrough has reached a predetermined temperature, to move inwardly toward each other under the effects of the heat, and eventually to assume a position similar to that indicated in the broken lines, in which position the passage through the casing is left practically unobstructed.

It will be noted that in this unit the thermosensitive element itself constitutes the valve, the necessary seat for complete and satisfactory closure being provided by the inner wall of the casing 1, against which the edges of the said elements bear under pressure when the latter are in the extended position, as they are when the temperature is low. For the purpose of obtaining a more perfect joint between the sides of the casing and the edges of the thermosensitive element, the edges of the latter may be beveled to conform to the inner surfaces of the casing against which they bear.

The manner in which the thermosensitive element is secured in the casing is most clearly illustrated in the present instance in Figs. 2 and 3. In the thermosensitive element the vanes 2, 2, which normally are flat are secured together at one end by means of an intermediate bar 3, the ends of which bar extend beyond the sides of the blade and are adapted to fit in grooves 4, 4, in the inside of the casing and extending in from one end of the latter. The ends of the bar 3 may be secured in the groove 4 by soldering or in any other suitable fashion.

In the modification of Fig. 5, I have shown the unit adapted for use in connection with hot water heating systems. In this instance, the vanes 2, 2, are reversed from the position shown in Fig. 1, so that their normal position when the temperature is low is that shown in full lines, the vanes separating as the temperature increases to finally seat themselves against the walls of the casing and completely shut off the passage. It will be noted that in the normal position shown in the full lines, the vanes are slightly bowed so that when expanded they will assume the flat condition which in this instance is essential to a complete closing of the passage. With devices of this nature installed in a hot water heating system, the temperature of the radiators may be controlled to maintain more or less constant temperatures in the chambers which they occupy.

A still further modification, in this instance adapted for use in single pipe steam heating systems, is illustrated in Fig. 6. In this instance, the normal position of the valve which it may be made to assume at any desired temperature is shown in the full lines, the vanes 2, 2, in this position being slightly bowed whereby a slight opening is left through the passage for the return to the boiler of the condensed steam. One of the units of this construction being associated with each radiator of the system, when the temperature of any single radiator rises above a predetermined point, the vanes tend to straighten out preparatory to coming together under the effect of still higher temperatures. When the vanes become straight and flat, the flow of the heating fluid through the casing is completely shut off and the steam is directed to other radiators. As the said other radiators of the system become heated, the valves associated therewith also operate to completely shut off the steam flowing therethrough. When, however, the valves of all the radiators are closed off, the banking of the steam in the pipes with the increased temperature and pressure will cause the vanes to move together into the position shown in dot and dash lines, thereby permitting a flow of steam to all of the radiators. A valve of this nature is calculated to maintain a substantially uniform temperature in the radiators of the entire system.

In the modifications illustrated in Figs. 7, 8, 9 and 10, I have shown the unit adapted for use with the circulating cooling systems of the engines of motor vehicles. It is often desirable in valves of this type to permit a slight circulation of the cooling fluid even when the engine is cold, both to permit circulation of the water already partially warmed through the engine water jackets by returning it through one pipe or one section of the radiator to the suction side of the pump and to prevent the freezing up of the radiator during the warming up process. It has been customary, where this flow is required, to provide a by-pass extending from the radiator intake duct to the radiator discharge duct, this requiring, however, the provision of a duct external to the radiator and the normal intake and discharge ducts.

In the present instance I have shown the vanes 2, 2, secured together by a special hollow fitting 5, which latter is riveted in the casing 1, this hollow casing having extending therefrom a smaller pipe 6 which extends longitudinally and centrally of the duct 1. The openings in the hollow fitting 5, which latter is substantially triangular in shape, are in the sloping side faces, and the vanes 2, 2, are secured to the fitting intermediate the ends in such manner that the rear ends of the vanes function as valves to close the said side openings of the hollow fitting.

The vanes at the starting low temperature of the motor are adapted to occupy the position shown in full lines in Fig. 7, in which position the longer ends of the vanes bear against the inner face of the casing 1 to completely close the passage therethrough, while the smaller rear ends which lie along the faces of the fixture 5 occupy a position in alignment with the main portions of the vanes and slightly separated from the sides of the fixture whereby fluid is permitted to pass into the interior of the fixture and into the duct 6. The fixture may be attached in the manner shown in Fig. 10, in which the small duct 6 is shown communicating with a similar small duct 7 which passes through the intake fixture of the radiator and has its other end attached to the header plate of the radiator directly over one of the tubes of the latter. There is, when starting at low temperatures therefore, a small amount of the fluid in the cooling system permitted to circulate through these ducts 6 and 7. As the temperature of the engine increases, however, the ends of the vanes 2, 2, bend inwardly toward each other in such fashion as increasingly to open the passage through the casing 1, and by reason of bearing against the faces of the fixture 5 to close the side openings therein, the sides of the said fixture constituting the seats for the rear ends of the vanes 2, which latter constitute the valves closing the openings into the duct 6.

In Fig. 11, a modification of the device is shown, in which with a thermosensitive element similar to that shown in Fig. 1, a separate element 10 is secured across the mouth of an opening 11 in the casing 1, this opening 11 being for the purpose of communication with a by-pass such as previously mentioned extending from the intake duct of the radiator to the discharge duct. The vane 10 in this instance is adapted, as the temperature of the circulating fluid increases, to move down over the mouth of the opening 11 and seat itself against the inner surface of the casing 1 to eventually completely close the said opening. Also under the action of the increasing temperature, the vanes 2, 2, of the main element come together in the aforedescribed manner to open the passage through the casing and permit flow of the circulating fluid to the radiator.

A most important advantage of this device is found in the fact that a very slight movement of the thermosensitive elements is sufficient to give a comparatively large opening in the passage through the casing, this form of valve accordingly being found extremely sensitive and useful.

A still further great advantage is found in the adaptability of the device for many purposes and to suit widely varying conditions.

The device further is reduced to the utmost simplicity and is of a high commercial practicability. The manufacturing advantages of the device will be apparent.

It will be understood that still other and numerous modifications may be had without departure from the essential features of the invention.

I claim:

1. A thermostatic valve unit comprising a substantially tubular casing, and a thermosensitive element comprising two thermosensitive plates secured together and adapted at predetermined temperatures to seat themselves along substantially their entire edges against the inside of said casing to substantially close the passage formed by said casing.

2. A thermostatic valve unit comprising a substantially tubular casing, and a thermosensitive element in said casing and comprising a pair of thermosensitive plates secured together and adapted when straight to bear along substantially their entire edges against the inside of the casing to substantially close the passage formed by said casing.

3. A thermostatic valve unit comprising a tubular casing, a tube of lesser diameter established in said casing, and a thermosensitive element mounted in the casing and adapted in different positions to substantially close the passage therethrough and through said lesser tube.

4. A thermostatic valve unit comprising a cylindrical casing, and a thermosensitive element of semi-elliptical outline secured in the casing with its straight edge extending substantially diametrically thereacross, and adapted at predetermined temperature to bear at the curved edge against the inner surface of the casing, substantially as described.

WILLIAM J. FRANCKE.